(12) United States Patent
Rathonyi et al.

(10) Patent No.: US 6,772,215 B1
(45) Date of Patent: Aug. 3, 2004

(54) METHOD FOR MINIMIZING FEEDBACK RESPONSES IN ARQ PROTOCOLS

(75) Inventors: Bela Rathonyi, Malmö (SE); Joachim Sachs, Aachen (DE); Michael Meyer, Aachen (DE); Per Beming, Stockholm (SE); Mathias Johansson, Sollentuna (SE); Christiaan Roobol, Hässelby (SE); Erik Schön, Tokyo (JP); Kazuhiko Inoue, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/537,146

(22) Filed: Mar. 29, 2000

Related U.S. Application Data

(60) Provisional application No. 60/128,517, filed on Apr. 9, 1999.

(51) Int. Cl.[7] ............................................. G06F 15/16
(52) U.S. Cl. ...................................... 709/230; 370/229
(58) Field of Search ........................ 709/230; 370/229, 370/232, 394, 395.1, 349

(56) References Cited

U.S. PATENT DOCUMENTS

| | | | |
|---|---|---|---|
| 4,439,859 A | | 3/1984 | Donnan ........................ 371/32 |
| 5,477,550 A | * | 12/1995 | Crisler et al. ................ 714/748 |
| 5,566,170 A | * | 10/1996 | Bakke et al. ................. 370/392 |
| 5,673,252 A | * | 9/1997 | Johnson et al. .............. 370/449 |
| 5,752,078 A | * | 5/1998 | Delp et al. ...................... 710/7 |
| 5,754,754 A | | 5/1998 | Dudley et al. .......... 395/182.16 |
| 5,799,012 A | * | 8/1998 | Ayerst et al. ................ 370/336 |
| 5,968,197 A | * | 10/1999 | Doiron ........................ 714/748 |
| 5,991,299 A | * | 11/1999 | Radogna et al. ............. 370/392 |
| 6,034,963 A | * | 3/2000 | Minami et al. .............. 370/401 |
| 6,069,886 A | * | 5/2000 | Ayerst et al. ................ 370/336 |
| 6,317,430 B1 | * | 11/2001 | Knisely et al. .............. 370/394 |
| 6,359,877 B1 | * | 3/2002 | Rathonyi et al. ............ 370/349 |
| 6,473,399 B1 | * | 10/2002 | Johansson et al. ........... 370/229 |
| 6,542,490 B1 | * | 4/2003 | Ahmadvand et al. ........ 370/338 |

FOREIGN PATENT DOCUMENTS

EP  0 768806 A2  4/1997

OTHER PUBLICATIONS

Throughput analysis of some ARQ protocols in the presence of feedback errors by Cam et al.; IEEE; vol. 45 No. 1, Jan. 1997.*

Richard Cam and Cyril Leung; *Throughput Analysis of Some ARQ Protocols in the Presence of Feedback Errors;* IEEE Transactions on Communications; Jan. 1997; vol. 45, No. 1; pp. 35–44.

ISR, PCT/SE/ 00/00677, Completed Aug. 23, 2000.

* cited by examiner

*Primary Examiner*—Frantz B. Jean

(57) ABSTRACT

A method for minimizing feedback responses in an ARQ protocol is disclosed, whereby different mechanisms can be used to indicate erroneous D-PDUs and construct S-PDUs. The S-PDUs are constructed so as to optimize performance in accordance with certain criteria. One such criterion used is to minimize the size of the S-PDUs. A second such criterion used is to maximize the number of SNs included in an S-PDU of limited size.

64 Claims, 3 Drawing Sheets

| type=LIST |
|---|
| LENGTH=0 |
| LENGTH=4 |
| $SN_1=1$ |
| $SN_2=25$ |
| $SN_3=50$ |
| $SN_4=95$ |

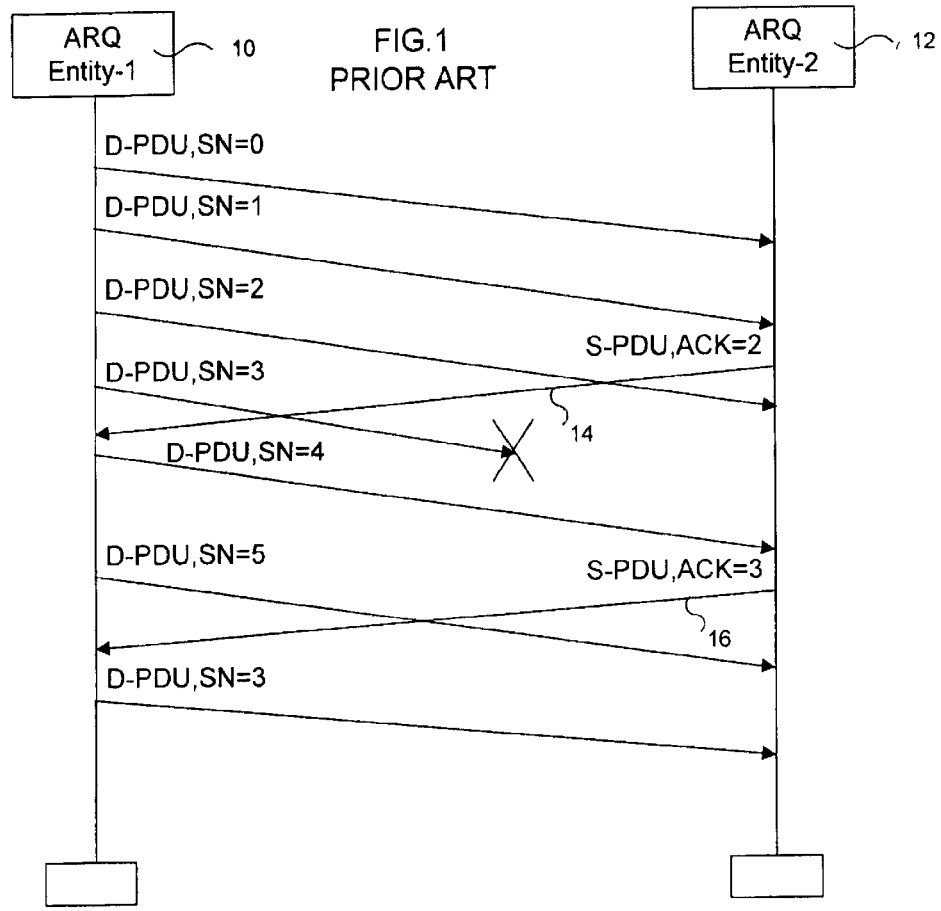

| type=ACK |
|---|
| SN |

FIG. 7

| Type=BITMAP' |
|---|
| FSN |
| LENGTH |
| Bitmap |
| Type=LIST' |
| LENGTH |
| $SN_1$ |
| $L_1$ |
| ... |
| $SN_{LENGTH}$ |
| $L_{LENGTH}$ |
| Type=BITMAP' |
| LENGTH |
| bitmap |
| Type=NO_MORE |

FIG. 8

| Field | Field Value | | Field size |
|---|---|---|---|
|  | Decimal | Bits |  |
| LIST' | N/A | 01 | 2 |
| LENGTH | 1 | 00001 | 5 |
| $SN_1$ | 51 | 000000110011 | 12 |
| $L_1$ | 27 | 11011 | 5 |
| ACK | N/A | 11 | 2 |
| SN | 101 | 000001100101 | 12 |

FIG. 9

| Field | Field Value | | Field size |
|---|---|---|---|
|  | Decimal | Bits |  |
| LIST' | N/A | 01 | 2 |
| LENGTH | 0 | 00000 | 5 |
| LENGTH | 4 | 00100 | 5 |
| $SN_1$ | 1 | 000000000001 | 12 |
| $SN_2$ | 25 | 000000011001 | 12 |
| $SN_3$ | 50 | 000001100100 | 12 |
| $SN_4$ | 95 | 000001011111 | 12 |
| ACK | N/A | 11 | 2 |
| SN | 101 | 000001100101 | 12 |

FIG. 10

| Field | Field Value | | Field size |
|---|---|---|---|
|  | decimal | Bits |  |
| BITMAP' | N/A | 10 | 2 |
| LENGTH | 2 | 00010 | 5 |
| FSN | 27 | 000000011011 | 12 |
| Bitmap | 28-43 | 0001111011101011 | 16 |
| LIST' | N/A | 01 | 2 |
| LENGTH | 2 | 00010 | 5 |
| $SN_1$ | 91 | 000001011011 | 12 |
| $L_1$ | 3 | 00011 | 5 |
| $SN_1^2$ | 101 | 000001100101 | 12 |
| $L_2$ | 0 | 00000 | 5 |
| NO_MORE | N/A | 00 | 2 |

FIG. 11

| Field | Field Value | | Field size |
|---|---|---|---|
| | *decimal* | *Bits* | |
| BITMAP' | N/A | 10 | 2 |
| LENGTH | 11 | 01011 | 5 |
| FSN | 3 | 000000000011 | 12 |
| Bitmap | 4-10 | 1110111 | 88 |
| | 11-20 | 0111101111 | |
| | 21-30 | 1111111111 | |
| | 31-40 | 1101111111 | |
| | 41-50 | 1111011111 | |
| | 51-60 | 1111011111 | |
| | 61-70 | 1111101111 | |
| | 71-80 | 1111111011 | |
| | 81-90 | 1011111111 | |
| | 91 | 0 | |
| ACK | N/A | 11 | 2 |
| SN | 101 | 000001100101 | 12 |

FIG. 12

| Field | Field Value | | Field size |
|---|---|---|---|
| | *decimal* | *Bits* | |
| LIST' | N/A | 01 | 2 |
| LENGTH | 1 | 00001 | 5 |
| $SN_1$ | 10 | 000000001010 | 12 |
| $L_1$ | 20 | 10100 | 5 |
| BITMAP' | N/A | 10 | 2 |
| LENGTH | 1 | 00001 | 5 |
| Bitmap | 31-38 | 01011011 | 8 |
| ACK | N/A | 11 | 2 |
| SN | 101 | 000001100101 | 12 |

FIG. 13

METHOD FOR MINIMIZING FEEDBACK RESPONSES IN ARQ PROTOCOLS

CROSS-REFERENCES TO RELATED APPLICATIONS

This Application for Patent claims the benefit of priority from, and hereby incorporates by reference the entire disclosure of, co-pending U.S. Provisional Application for patent Ser. No. 60/128,517, filed Apr. 9, 1999.

BACKGROUND OF THE INVENTION

1. Technical Field of the Invention

The present invention relates in general to the telecommunications field and, in particular, to a method for minimizing feedback responses in Automatic Repeat Request (ARQ) protocols, such as, for example, selective-repeat ARQ protocols.

2. Description of Related Art

When data is conveyed between nodes in a telecommunication network, certain algorithms are used to recover from the transmission of erroneous data and the loss of data on the transmission links between the nodes. An algorithm commonly used to recover from the transmission of erroneous data is referred to as an ARQ protocol.

The existing ARQ protocols (i.e., algorithms) include two peer entities that communicate with each other over transmission links. Each such entity includes a receiver and a sender. The units of data conveyed between the peer entities are commonly referred to as Protocol Data Units (PDUs). The ARQ protocols include certain rules for sending and receiving PDUs, as well as rules for the structure of the PDUs. As such, the name "Automatic Repeat Request" indicates the basic function of the protocol: the receiver requests the sender to retransmit those PDUs that were lost or contained errors during transmission.

The receiver can inform the sender about which PDUs were correctly received (i.e., receiver acknowledges correctly-received PDUs) and/or which PDUs were incorrectly received. When the sender receives this information, it retransmits the "lost" PDUs. In other words, an ARQ protocol is a set of rules that allow the use of efficient retransmission mechanisms between a sending side and receiving side in a communication system. These rules specify, for example, how and in what form the PDUs are to be constructed so that the receiving side can interpret the conveyed PDUs correctly and respond to them accordingly.

Three main types of information elements (PDUs) can be transferred between two ARQ peer entities: user data; error recovery control data; and common control data. These three types of PDUs can be found in all of the existing ARQ protocols. A user data PDU contains at least user data and a sequence number. An error recovery control data PDU contains various control information needed for error recovery and control functions such as positive and negative acknowledgments. A common control data PDU contains common control data.

In the known High Level Data Link Control (HDLC) protocol, which forms the basis for many existing ARQ protocols, the three types of PDUs are called, respectively, information frames (I-frames), supervisory frames (S-frames), and unnumbered frames (U-frames). Examples of HDLC-derived ARQ protocols are the Radio Link Protocol (RLP) used in the Global System for Mobile Communications (GSM), the Radio Link Control (RLC) and Logical Link Control (LLC) protocols used in the General Packet Radio Service (GPRS), the Infrared Link Access Protocol (IrLAP) used in IrDA systems, and the LAP-B protocol used in X.25 systems. Notably, PDUs that include user data and at least a sequence number are denoted herein as Data-PDUs (D-PDUs), and PDUs that include control data needed for error control/recovery are denoted herein as Status-PDUs (S-PDUs).

In most communication systems, user data information is conveyed in both directions between the peer entities. A common feature included in an ARQ protocol is the possibility of including error control information in the user data PDUs. This capability is known as "piggybacking". For example, an acknowledgment is included in all I-frames (i.e., D-PDUs) of HDLC-derived protocols. The acknowledgment informs the peer entity about the sequence number of the last (in-sequence) correctly received PDU.

The most common existing ARQ protocols implement one or more mechanisms to recover from errors on a transmission link, such as a Stop-and-Wait ARQ, Go-back-N ARQ, and Selective-Repeat ARQ. The use of these mechanisms and ARQs in general is well known.

FIG. 1 is a sequence diagram that illustrates the use of ARQ protocols. As shown, two ARQ peer entities 10, 12 are communicating with each other. The arrows in FIG. 1 indicate the transmission of PDUs between the two entities, and the content of each PDU is described directly above the respective arrow. Referring to FIG. 1, a sequence of transmitted D-PDUs and S-PDUs is shown. A D-PDU includes user data, a sequence number (SN), and possibly piggybacked error control information. An S-PDU includes status information but no user information. A sequence number (SN=x) is associated with a D-PDU to identify that specific D-PDU. An acknowledgment (ACK=x) is used to acknowledge any PDU with a SN<x. A negative acknowledgment (NAK=x) is used to acknowledge that a PDU (with an SN=x) has not been correctly received.

Two types of error control feedback responses are shown in FIG. 1. For one of the feedback responses (e.g., S-PDU, ACK=2) 14, the second ARQ peer entity 12 has acknowledged that it has received the PDUs with the SN=0 and SN=1. For the second type of feedback response (e.g., S-PDU, NAK=3) 16, the second peer entity 12 has indicated that the PDU with the SN=3 was corrupted and should be retransmitted by the first peer entity 10.

As discussed above, the S-PDUs are special PDUs which are transmitted between peer entities. An S-PDU includes information about the SNs of corrupted PDUS. Two main methods are currently used for coding the SNs within S-PDUs. One such method is to use a list of SNs to be retransmitted. The second method is to use a bitmap to represent the SNs to be retransmitted. As such, apart from representing SNs, an S-PDU also includes a format identifier which can be used by a receiver to distinguish between the different PDU formats (i.e., D-PDUs and S-PDUs).

The list method used for coding SNs includes the SNs of the erroneous PDUs in the S-PDU. If the length of the list is not predefined and thereby known, this length information is indicated in the S-PDU. For example, a length field can be included in the S-PDU. FIG. 2 shows such an S-PDU, which can be created by a receiver using a list method for coding SNs.

Referring to FIG. 2, a receiver can create an S-PDU with the contents shown, if the sender has transmitted a sequence of D-PDUs with SNs=0–15, and the PDUs with SNs=3, 5, 6, 7 and 8 have failed (not been correctly received). For example, the first two elements in the list (after the length field) indicate that the D-PDU with SN=3 was erroneous. The third and fourth elements in the list indicate that the D-PDUs with SNs=5–8 were erroneous. The final element is included to acknowledge the remaining PDUs (SNs up to 15).

The size of the S-PDU depends on the number of bits used to represent the PDU format identifier field, the length field and the SN field. As such, the size of an S-PDU can be calculated by the expression:

$$DU.SIZE_{LIST}=size(pdu.format.field)+size(length.field)+ no.listelements*size(seq.no.field). \quad (1)$$

For example, this list method is used in the SSCOP protocol, wherein two S-PDU formats exist and are denoted by the term "STAT" for a variable list length, and "USTAT" for a list with a limited number of elements (e.g., 2 elements).

FIG. 3 shows an S-PDU which can be created by a receiver using a bitmap method for coding SNs. When a bitmap is used to indicate SNs, the receiver creates the S-PDU from the SN of the last in-sequence correctly received D-PDU and a bitmap. This SN is referred to as a Start SN (SSN). Consequently, this S-PDU implicitly acknowledges all D-PDUs received up to the value of the SSN. Each location in the bitmap is used to address a specific S-PDU relative to the SSN. Typically, the size of the bitmap is fixed to the size of the ARQ receiver window and does not have to be explicitly indicated. If the bitmap is not fixed, the length has to be indicated.

The bitmap shown in FIG. 3 shows an S-PDU created from the example described above with respect to FIG. 2, and a window size of 16. As such, each location in the bitmap can have one of the two values, 0 or 1: A "1" means that SN=(SSN+bit_position) has been correctly received; and a "0" value means that SN=(SSN+bit_position) has not been correctly received. Of course, the meaning of the "0" and "1" values can be interchanged. The size of an S-PDU when using such a bitmap can be derived from the following expression:

$$PDU.SIZE_{BITMAP}=size(pdu.format.field)+size(SSN.field)+size(bit-map.field). \quad (2)$$

Both the RLC and LLC protocols in the GPRS system use such an expression and convey bitmaps between peer entities for error control purposes.

A significant problem with existing ARQ protocols is that they are static in construction (e.g., fixed length messages are used). In certain situations, this approach leads to a waste of bandwidth resources, because a great deal of overhead information is transmitted unnecessarily. For example, such situations can occur in systems having a large number of D-PDUs being transmitted between two ARQ peer entities, and these D-PDUs have to be acknowledged and selectively requested for retransmission. For some error control situations, the existing solutions introduce a significant amount of unnecessary overhead. The following example illustrates such a situation.

In the Wideband-Code Division Multiple Access (WCDMA) system currently being standardized for the so-called 3rd Generation Cellular Communication System, one ARQ protocol used is an RLC protocol. The,SN set includes the values 0–4095, which means that each SN is coded with 12 bits. An assumption can be made that for high data rates, a relatively large set of SNs will have to be addressed in some S-PDUs. Also, assume that the status of 100 D-PDUs (SN=1–100) needs to be communicated between the RLC peer entities in an S-PDU.

Table 1 below shows the number of bits needed to code an S-PDU using the list and bitmap methods described above. Different error circumstances are provided to highlight the large difference in the number of bits required for the two methods. Assume that the following element sizes are used: bitmap=128 bits; length=5 bits; and one PDU format identifier=1 bit (for distinguishing between a D-PDU and an S-PDU). As such, the different S-PDU sizes shown in Table 1 are calculated in accordance with Equations (1) and (2) above, respectively.

As illustrated by rows 2–5 in Table 1, both of the existing solutions have problems with efficiently building small S-PDUs for error circumstances shown. The length of the LIST does not depend so much on the number of erroneous D-PDUs, but rather on the distribution of the errors within the window used. This fact becomes evident by comparing rows 1 and 2 in Table 1.

TABLE 1

| | Erroneous D-PDUs | # | Size of S-PDU (bits) | |
|---|---|---|---|---|
| | (SN) | SN | LIST | BITMAP |
| 1 | 51–77 | 27 | 42 | 141 |
| 2 | 1, 25, 50, 95 | 4 | 114 | 141 |
| 3 | 27–30, 35, 39, 41, 91–93 | 10 | 138 | 141 |
| 4 | 3, 7, 11, 16, 33, 45, 55, 66, 78, 82, 91 | 11 | 282 | 141 |
| 5 | 10–29, 31, 33, 36 | 23 | 114 | 141 |

A general statement of the problem to be solved is to determine how to efficiently represent (encode) in a message the status of an arbitrary amount and distribution of n numbers from a set of m numbers. As such, a significant need exists for a method that can be used to minimize the size of S-PDUs in an ARQ protocol Also, a significant need exists for a method that can be used to maximize the number of SNs in an S-PDU with limited size, if it is not possible to fit all potential SNs into a single S-PDU. As described in detail below, the present invention successfully resolves the above-described problems and other related problems.

SUMMARY OF THE INVENTION

In accordance with an embodiment of the present invention, a method for minimizing feedback responses in an ARQ protocol is provided, whereby different mechanisms can be used to indicate erroneous D-PDUs and construct S-PDUs. In particular, these different mechanisms can be combined in a single S-PDU. The S-PDUs are constructed so as to optimize system performance in accordance with certain criteria. One such criterion used is to minimize the size of the S-PDUs. A second such criterion used is to maximize the number of SNs included in an S-PDU of limited size.

An important technical advantage of the present invention is that radio interface bandwidth resources can be saved.

Another important technical advantage of the present invention is that protocol overhead can be minimized.

Still another important technical advantage of the present invention is that system capacity can be increased.

Yet another important technical advantage of the present invention is that the number of feedback responses in a selective-repeat ARQ protocol can be minimized.

BRIEF DESCRIPTION OF THE DRAWINGS

A more complete understanding of the method and apparatus of the present invention may be had by reference to the following detailed description when taken in conjunction with the accompanying drawings wherein:

FIG. 1 is a sequence diagram that illustrates the use of ARQ protocols;

FIG. 2 is a diagram that shows an S-PDU which can be created by a receiver using an existing list method for coding SNs;

FIG. 3 is a diagram that shows an S-PDU which can be created by a receiver using an existing bitmap method for coding SNs;

FIG. 4 is a bitmap message for use in an S-PDU, constructed in accordance with a first embodiment of the present invention;

FIG. 5 is a diagram of a message with the fields and contents of the LIST S-PDU for row 2 in Table 1, constructed in accordance with the first embodiment of the present invention;

FIG. 6 is a diagram of the fields of a LIST' message in an S-PDU, constructed in accordance with the first embodiment of the present invention;

FIG. 7 is a diagram that shows the contents of an "ACK" message constructed in accordance with the second embodiment of the present invention;

FIG. 8 is a diagram that illustrates how an S-PDU can be constructed in accordance with the combination method of the second embodiment;

FIG. 9 is a diagram that shows the contents of row 1 of Table 1 in a combination S-PDU, constructed in accordance with the second embodiment of the present invention;

FIG. 10 is a diagram that shows the contents of row 2 of Table 1 in a combination S-PDU, constructed in accordance with the second embodiment of the present invention;

FIG. 11 is a. diagram that shows the contents of row 3 of Table 1 in a combination S-PDU, constructed in accordance with the second embodiment of the present invention;

FIG. 12 is a diagram that shows the contents of row 4 of Table 1 in a combination S-PDU, constructed in accordance with the second embodiment of the present invention; and FIG. 13 is a diagram that shows the contents of row 5 of Table 1 in a combination S-PDU, constructed in accordance with the second embodiment of the present invention.

DETAILED DESCRIPTION OF THE DRAWINGS

The embodiments of the present invention and their advantages are best understood by referring to FIGS. 1–13 of the drawings, like numerals being used for like and corresponding parts of the various drawings.

Essentially, in accordance with a first embodiment of the present invention, a method for minimizing feedback responses in an ARQ protocol is provided, whereby different mechanisms can be used to indicate erroneous D-PDUs and construct S-PDUs. The S-PDUs are constructed so as to optimize performance in accordance with certain criteria. One such criterion used is to minimize the size of the S-PDUs. A second such criterion used is to maximize the number of SNs included in an S-PDU of limited size.

Specifically, hereinafter, the basic components being described are messages. For this embodiment, such a message can be described by using a Type, Length, Value (TLV) syntax. In other words, each message includes three fields. One field includes type information, the second field includes length information, and the third field includes a value. The size of the type field is preferably non-zero, while the sizes of the other two fields can be zero.

Notably, as mentioned earlier, all existing bitmap solutions include information about the sequence number (herein called the SSN) of the last received in-sequence D-PDU in a constructed S-PDU. The SSN indicates that no errors exist prior to that sequence number. In other words, the SSN is used to acknowledge all D-PDUs having SNs up to that of the SSN.

For this exemplary embodiment, a basic message to be used for minimizing feedback responses in an ARQ protocol can be constructed as follows. Using a BITMAP method for this embodiment, the SN included in a constructed S-PDU indicates the SN of any (not necessarily the first) erroneous D-PDU from the set of SNs. The status of the subsequent SNs are indicated in the bitmap. Although the SN of the first erroneous D-PDU is used in this exemplary embodiment, it should be understood that any D-PDU (from the SN set) can be used in the bitmap method instead. In that case, the bitmap also has to include the status (0 or 1) of the SN included in the constructed S-PDU. As such, a "BITMAP" message can be created with a type identifier field, a first SN (FSN) field, a bitmap length field, and a bitmap field. FIG. 4 illustrates a bitmap message with such fields for use in an S-PDU, in accordance with the first embodiment of the present invention.

Referring to the bitmap message shown in FIG. 4, a number of methods can be used to represent the length of the bitmap (LENGTH field). For one method, a predefined number of bits can be used to represent the size of the bitmap in a basic data unit. Such a data unit can have any granularity and include, for example, one or more bits, bytes, words, etc. For example, if a byte is used as the basic data unit, the value, x, in the LENGTH field means that 8*x SNs are covered by the bitmap. This resulting value also represents the size of the bitmap in bits.

For a second method used to represent the length of the bitmap, a different SN can be used to indicate the last SN covered by the bitmap. The size of the LENGTH field is then equal to the size of the FSN field. As such, the size of the bitmap can be calculated by subtracting the FSN value from the LENGTH value.

A third method that can be used for representing the length of the bitmap is to fix the size of the bitmap so that no LENGTH field is required in the S-PDU. Alternatively, the size of the LENGTH field can be set to zero. Also, the size of the FSN field can also be set to zero if the SN that the bitmap covers is signalled remotely. Such a method is described in more detail below.

Notably, a conventional data compression method can be used to compress the information in the bitmap field. As such, both normal and compressed bitmaps can be included in one S-PDU. In this case, the value of the type field for the compressed bitmap would be different than that for a normal bitmap.

As mentioned earlier, a significant drawback of the existing LIST methods is that two SNs are required for each error group. An error group comprises a single error or several consecutive errors of D-PDUs. In order to resolve such a problem using a LIST method in accordance with this exemplary embodiment, only erroneous SNs are listed. In other words, a new LIST type can be defined wherein only single errors are listed. Consequently, the size of a resulting S-PDU can be significantly reduced for certain error situations, in comparison with the existing LIST solutions.

Another method that can be used to reduce the size of S-PDUs, in accordance with this embodiment, is to combine an existing LIST method (2 SNs per error group) with the above-described single error SN LIST method to create the list message. For example, the existing LIST method can be improved significantly by introducing the following rules for creating the LENGTH field value:

(1) A zero value means that a single error SN LIST method is applied. A second (new) length field is included directly after the original LENGTH field to indicate the number of single erroneous SNs that follow directly after the second field. All list elements represent single erroneous SNs, and no acknowledgment is provided while using this list method.

(2) An odd value implies that the last list element is an acknowledgment.

(3) An even value (excluding zero) implies that the last element is not an acknowledgment. Consequently, following the above-described rules in accordance with this embodiment, the (LIST) S-PDU for row 2 in Table 1 now contains the fields and contents shown in FIG. 5. As such, if the field sizes shown in row 2 of the example illustrated by Table 1 were to be used with respect to the embodiment illustrated by FIG. 5, then the total size of the S-PDU would be 59 bits. Consequently, in accordance with the present invention, the number of bits needed for the resulting S-PDU is significantly smaller than the number of bits (114) needed for the existing LIST solution.

FIG. 6 is a diagram that illustrates another method that can be used to reduce the size of an S-PDU using a LIST method. The method used in accordance with this embodiment is to include a field after each list element which determines the length of the error, instead of indicating the length of the error with an "ending" SN. In most systems, the size of the length field would then be substantially smaller than the size of the SN field. Furthermore, typically there is no need to represent very large consecutive, erroneous D-PDUs (i.e., a large error group) in an S-PDU.

Referring to FIG. 6, the fields of a new message (denoted as LIST') in an S-PDU are shown. The new length field introduced after each $SN_i$ is denoted $L_i$ for $1 \leq I \leq LENGTH$. Notably, a value of zero can be used for $L_i$ to further improve the functionality of the resulting LIST' message. As such, the following alternatives can be used:

(1) A zero value for $L_i$ means that $SN_i$ is an acknowledgment (i.e., Li is not pointing out an error).

(2) A zero value represents the end of the LIST' message. The first LENGTH field can be omitted if the interpretation of the last SN has been predefined. For example, the last SN can be restricted so as to always be an acknowledgment (e.g., as in the first alternative), or the length can be predefined (e.g., so as to point out a single error).

In accordance with a second embodiment of the present invention, a number of different message types can be combined to create an S-PDU. These message types can be added in any arbitrary order in the S-PDU, and there is no rule on the number of messages or the type of message that can be included in the S-PDU. For this exemplary embodiment, each such message includes a type identifier, and the length is either fixed or indicated by a length field for each specific message. The first type identifier preferably has a predefined position in the resulting S-PDU. The rest of the type identifiers can be located at arbitrary locations depending on the sizes of the included messages. For example, the messages, LIST', BITMAP' and ACK can be included in the S-PDU.

The number of such messages that can possibly be included in an S-PDU determines the size (bits) of the type identifier field used in the S-PDU. For example, the size of such a type identifier field can be determined by the following expression:

$$\text{ize(type. field)} = \lfloor \log_2(\text{number of possible messages}+1) \rfloor, \quad (3)$$

where the operator $\lfloor \ \rfloor$ rounds the argument off to the next highest integer value. The "+1" part of the argument is used so that a type identifier can be used to indicate that no other messages are included in an S-PDU. This special identifier is denoted herein as a "NO_MORE" message. As such, in accordance with Equation (3), the size of the type field is 2 bits for three different messages, because $\lfloor \log_2(4) \rfloor 2$.

The contents of an "ACK" message constructed in accordance with this embodiment are shown in FIG. 7. The ACK message shown includes a type identifier field and SN. This ACK message marks the end of an S-PDU, and all prior D-PDUs not indicated to be erroneous within this S-PDU are acknowledged by the SN. Consequently, when such an ACK message is included in an S-PDU, there is no need to include a NO_MORE message to terminate the combined S-PDU.

Assume that a LIST' message with an acknowledgment feature (i.e., a zero value for $L_i$ means that $SN_i$ is an acknowledgment) is used (with a LENGTH field). When a BITMAP' message is included directly after a LIST' message, the size of the FSN field is zero. As such, the first SN which is represented in the bitmap is $SN_{LENGTH}+L_{LENGTH}$. Furthermore, a zero in the LENGTH field of the LIST' message means that an additional LENGTH field is included, and the message is constructed as shown in FIG. 5 with no $L_{SNi}$ fields.

Another way to obtain the above-described LIST feature is to define a new type (denoted, for example, "LIST"). However, the size of the type field can be affected, which can result in a larger S-PDU. In any event, there is a trade-off (which is system dependent) to consider in selecting the exact rules to follow for the combination method described above.

FIG. 8 is a diagram that illustrates how an S-PDU can be constructed in accordance with the combination method described above. As shown, the resulting S-PDU includes two BITMAP' messages and one LIST' message. The second BITMAP' message does not include an FSN field (or, the size of the FSN field is zero). Consequently, the first element in the bitmap represents the SN having the value, $SN_{LENGTH}+L_{LENGTH}$.

In order to demonstrate the advantages of the above-described combination method, it can be applied to the example described above with respect to Table 1. As such, Table 2 shows different messages (along with their corresponding bit values) which can be combined in an S-PDU, in accordance with the second embodiment of the present invention. For this embodiment, each S-PDU starts with one of the type identifiers shown. Also, the sizes of the LENGTH and $L_{SNi}$ fields are fixed to 5 bits.

Consequently, these fields can each hold a value between $0-32(2^5)$ Notably, although the sizes of the fields are fixed, their sizes are not necessarily equal, as in this example (i.e., the size of the LENGTH field in the BITMAP' message can be different than the size of the LENGTH field in the LIST' message). The value of the LENGTH field in the BITMAP' message corresponds to the size of the bitmap in bytes (i.e., a maximum of 8*32=256 SNs can be addressed in a single S-PDU). All of the fields containing an SN value have a size of 12 bits (i.e., the FSN, SN and SSN fields).

TABLE 2

| Type Identifier | Value |
|---|---|
| NO_MORE | 00 |
| LIST' | 01 |
| BITMAP' | 10 |
| ACK | 11 |

FIG. 9–13, respectively, are diagrams that show the contents of an S-PDU for each row shown in Table 1 for the above-described example. For this embodiment, the combination is selected so as to minimize the total size of the S-PDU.

As illustrated by the example described above with respect to Table 1, FIG. 9 shows the contents of row 1 in the resulting (combination) S-PDU, FIG. 10 shows the contents of row 2, and FIG. 11 shows the contents of row 3. Note that by including an ACK type instead of the list element $SN_i$ in FIG. 11, an additional 5 bits can be saved with respect to the total size of the S-PDU. FIG. 12 shows the contents of row 4 in the resulting S-PDU, and FIG. 13 shows the contents of row 5. As such, the contents of the entire coded S-PDU can be obtained by concatenating all values from the "bits" column. For example, the contents of row 1 of the S-PDU (FIG. 9) would appear as:

"01000010000001100111101111000001100101".

Table 3 shows the sizes of the S-PDUs constructed in accordance with the existing LIST and BITMAP methods, and also the combination method described above in accordance with the second embodiment. The sizes of the S-PDUs are calculated by adding the "Field size" columns in FIGS. 9–13. As illustrated by Table 3, the size of the S-PDU resulting from the combination method of the present invention is significantly smaller than the S-PDUs resulting from the existing solutions.

TABLE 3

| | Size of S-PDU (bits) | | |
|---|---|---|---|
| | State-of-the-art solutions | | Combination |
| | LIST | BITMAP | solution |
| 1 | 42 | 141 | 38 |
| 2 | 114 | 141 | 74 |
| 3 | 138 | 141 | 78 |
| 4 | 282 | 141 | 121 |
| 5 | 114 | 141 | 53 |

In many ARQ protocols, the size of the D-PDUs is predefined and can have limited set of different values. Padding can be used if the amount of user data provided to the sending ARQ entity is smaller than the size of the D-PDU. Padding is a technical whereby nonsensical data is used to fill up the remaining empty locations in the D-PDU. For example, if a D-PDU can be filled with 20 bytes of user data, and the sending ARQ entity has only 14 bytes of user data, the rest of the D-PDU can be filled or padded with 6 bytes of padding data. The length of the user data part is indicated in the D-PDU. The RLC protocol in the GPRS and W-CDMA systems use this type of padding function.

The combination method of the second embodiment can also be used efficiently with piggybacking. For example, an ARQ entity can piggyback status information after the end of the last user data byte, if enough space exists to fill the padding fields with a status message. A NO MORE type identifier is used whenever there is no status information to be included in a D-PDU which contains padding bytes. This piggybacking scheme advantageously reduces the number of packets being exchanged between two ARQ entities and, consequently, saves system capacity. The cost for such a piggybacking scheme is relatively low, because no field is reserved in the D-PDU for the piggybacking scheme, which is the case for existing ARQ protocols that use piggybacking.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for minimizing feedback responses in an ARQ protocol, comprising the steps of:
   sending a plurality of first data units over a communication link;
   receiving said plurality of first data units; and
   responsive to the receiving step, constructing a message field for a second data unit, said message field including a type identifier field and at least one of a sequence number field, a length field, and a content field.

2. The method of claim 1, wherein said message field comprises a bitmap message.

3. The method of claim 1, wherein said sequence number field includes a sequence number indicating an erroneous first data unit from said plurality of first data units.

4. The method of claim 1, wherein said sequence number field includes any sequence number from said plurality of first data units.

5. The method of claim 1, wherein said length field comprises a length value for said content field.

6. The method of claim 1, wherein said content field comprises a bitmap.

7. The method of claim 1, wherein said plurality of first data units comprises a plurality of ARQ protocol units including user data.

8. The method of claim 1, wherein said second data unit comprises information about missing or erroneous said first data units.

9. The method of claim 1, wherein the size of said length field is zero and a predefined bitmap size is used.

10. The method of claim 1, wherein said length field indicates a final sequence number in a bitmap.

11. The method of claim 1, wherein said length field comprises a value of zero.

12. The method of claim 1, wherein a size of said sequence number field equals zero.

13. The method of claim 1, wherein at least one of said plurality of first data units is used to piggy-back said message field.

14. The method of claim 1, wherein said ARQ protocol comprises a selective-repeat ARQ protocol.

15. A method for minimizing feedback responses in an ARQ protocol, comprising the steps of:
   sending a plurality of first data units over a communication link;
   receiving said plurality of first data units; and
   responsive to the receiving step, constructing a message field for a second data unit, said message field including a type identifier field and at least one of, a length field, a plurality of erroneous sequence number-fields, and a plurality of erroneous sequence number length fields, each of said plurality of erroneous sequence number fields associated with a respective one of said plurality of erroneous sequence number length fields.

16. The method of claim 15, wherein said message field comprises a list message.

17. The method of claim 15, wherein at least one value for said plurality of erroneous sequence number length fields comprises zero.

18. The method of claim 15, wherein said length field comprises a value of zero.

19. The method of claim 15, wherein said length field comprises an odd value indicating that the last SN is an acknowledgment.

20. The method of claim 15, wherein said length field comprises an even value indicating that the last SN is not an acknowledgment.

21. The method of claim 15, wherein said plurality of first data units comprises a plurality of ARQ protocol units including user data.

22. The method of claim 15, wherein said second data unit comprises information about missing or erroneous said first data units.

23. The method of claim 15, wherein at least one of said plurality of first data units is used to piggy-back said message field.

24. The method of claim 15, wherein said ARQ protocol comprises a selective-repeat ARQ protocol.

25. A method for minimizing feedback responses in an ARQ protocol, comprising the steps of:
sending a plurality of first data units over a communication link;
receiving said plurality of first data units; and
responsive to the receiving step, constructing between one to several message fields for a second data unit, said one to several message fields including a type identifier field and at least one of a sequence number field, a length field, a content field, a plurality of erroneous sequence number fields, and a plurality of erroneous sequence number length fields, each of said plurality of erroneous sequence number fields associated with a respective one of said plurality of erroneous sequence number length fields.

26. The method of claim 25, wherein said one to several message fields further comprise an acknowledgment message.

27. The method of claim 25, wherein the last of said one to several message fields includes an acknowledgment of all SNs not indicated erroneous by all other of said one to several message fields in said second data unit.

28. The method of claim 25, wherein said one to several message fields further comprise a no more message.

29. The method of claim 25, wherein said one to several message fields include a bitmap message.

30. The method of claim 25, wherein said sequence number field includes a sequence number indicating an erroneous first data unit from said plurality of first data units.

31. The method of claim 25, wherein said length field comprises a length value for said content field.

32. The method of claim 25, wherein said content field comprises a bitmap.

33. The method of claim 25, wherein said plurality of first data units comprises a plurality of ARQ protocol units including user data.

34. The method of claim 25, wherein said second data unit comprises information about missing or erroneous said first data units.

35. The method of claim 25, wherein the size of said length field is zero and a predefined bitmap size is used.

36. The method of claim 25, wherein said length field indicates a final sequence number in a bitmap.

37. The method of claim 25, wherein said length field comprises a value of zero.

38. The method of claim 25, wherein a size of said sequence number field equals zero.

39. The method of claim 25, wherein said one to several message fields include a list message.

40. The method of claim 25, wherein at least one value for said plurality of erroneous sequence number length fields comprises zero.

41. The method of claim 25, wherein said length field comprises an odd value indicating that the last SN is an acknowledgment.

42. The method of claim 25, wherein said length field comprises an even value indicating that the last SN is not an acknowledgment.

43. The method of claim 25, wherein said ARQ protocol comprises a selective-repeat ARQ protocol.

44. The method of claim 25, wherein at least one of said plurality of first data units is used to piggy-back said one to several message fields.

45. A system for minimizing feedback responses in an ARQ protocol, comprising:
a first peer entity;
a second peer entity; and
a communication link coupled between said first peer entity and said second peer entity for communicating data therebetween;
said first peer entity including means for sending a plurality of first data units over said communication link to said second peer entity;
said second peer entity including means for receiving said plurality of first data units, and constructing one to several message fields for a second data unit, said one to several message fields including a type identifier field and at least one of a sequence number field, a length field, a content field, a plurality of erroneous sequence number fields, and a plurality of erroneous sequence number length fields, each of said plurality of erroneous sequence number fields associated with a respective one of said plurality of erroneous sequence number length fields.

46. The system of claim 45, wherein said one to several message fields further comprise an acknowledgment message.

47. The system of claim 45, wherein the last of said one to several message fields includes an acknowledgment of all SNs not indicated erroneous by all other of said one to several message fields in said second data unit.

48. The system of claim 45, wherein said one to several message fields further comprise a no more message.

49. The system of claim 45, wherein said one to several message fields include a bitmap message.

50. The system of claim 45, wherein said sequence number field includes a sequence number indicating an erroneous first data unit from said plurality of first data units.

51. The system of claim 45, wherein said length field comprises a length value for said content field.

52. The system of claim 45, wherein said content field comprises a bitmap.

53. The system of claim 45, wherein said plurality of first data units comprises a plurality of ARQ protocol units including user data.

54. The system of claim 45, wherein said second data unit comprises information about missing or erroneous said first data units.

55. The system of claim 45, wherein the size of said length field is zero and a predefined bitmap size is used.

56. The system of claim 45, wherein said length field indicates a final sequence number in a bitmap.

57. The system of claim 45, wherein said length field comprises a value of zero.

58. The system of claim 45, wherein a size of said sequence number field equals zero.

59. The system of claim 45, wherein said one to several message fields include a list message.

60. The system of claim 45, wherein at least one value for said plurality of erroneous sequence number length fields comprises zero.

61. The system of claim 45, wherein said length field comprises an odd value indicating that the last SN is an acknowledgment.

62. The system of claim 45, wherein said length field comprises an even value indicating that the last SN is not an acknowledgment.

63. The system of claim 45, wherein said ARQ protocol comprises a selective-repeat ARQ protocol.

64. The system of claim 45, wherein at least one of said plurality of first data units is used to piggy-back said one to several message fields.

* * * * *